United States Patent
Chu et al.

(10) Patent No.: US 7,325,085 B2
(45) Date of Patent: Jan. 29, 2008

(54) MOTHERBOARD AND CONTROL METHOD THEREOF

(75) Inventors: Hsiu Ming Chu, Shindian (TW); Kuan-Jui Ho, Shindian (TW); Chung-Che Wu, Shindian (TW)

(73) Assignee: VIA Technologies, Inc., Taipei (TW)

( * ) Notice: Subject to any disclaimer, the term of this patent is extended or adjusted under 35 U.S.C. 154(b) by 92 days.

(21) Appl. No.: 11/263,970

(22) Filed: Nov. 2, 2005

(65) Prior Publication Data

US 2006/0212638 A1    Sep. 21, 2006

(30) Foreign Application Priority Data

May 11, 2005   (TW) ............................... 94115304 A

(51) Int. Cl.
*G06F 13/36* (2006.01)
(52) U.S. Cl. ...................................... 710/306; 713/100
(58) Field of Classification Search ........ 710/305–306; 713/100; 714/23
See application file for complete search history.

(56) References Cited

U.S. PATENT DOCUMENTS

| | | | |
|---|---|---|---|
| 6,701,403 B2* | 3/2004 | Lary et al. | 710/305 |
| 7,055,064 B2* | 5/2006 | Lin | 714/23 |
| 2005/0138348 A1* | 6/2005 | Bolay et al. | 713/100 |

* cited by examiner

*Primary Examiner*—Clifford Knoll
(74) *Attorney, Agent, or Firm*—Birch, Stewart, Kolasch & Birch, LLP

(57) ABSTRACT

A motherboard includes a south-bridge chipset, a north-bridge chipset and a central processor unit (CPU). The south-bridge chipset generates at least control-setting data. The north-bridge chipset has a reset register for controlling the north-bridge chipset to generate a reset signal and a control-set resister for storing the control-setting data generated by the south-bridge chipset. The CPU has a plurality of configuration parameters. The configuration parameters of the CPU are reset in accordance with the reset signal, and the control-setting data is written into the CPU by the north-bridge chipset to set one of the configuration parameters of the CPU.

8 Claims, 4 Drawing Sheets

MOTHERBOARD AND CONTROL METHOD THEREOF

BACKGROUND OF THE INVENTION

1. Field of Invention

The invention relates to a motherboard and the control method thereof. In particular, the invention relates to a motherboard that can reset the CPU and the control method thereof.

2. Related Art

The central processing units (CPU) of computers have evolved from the 8086, 80286, 80386, and 80486 series in the early days to the modern Pentium 4 series, rendering more and better functions, computing speeds, and processing efficiency. With powerful functions and increasing data processing amount, the system has to perform more actions during the power on procedure to ensure the proper functioning of the CPU.

Take the Pentium 4 series CPU as an example. The motherboard has to send out a CPU_reset signal to the CPU during the boot power on self test (POST) in order to reset the CPU and to set the frequency multiplier of the CPU. The frequency multiplier refers to the ratio between the frequencies of the CPU and the system bus. When the external frequency is fixed, increasing the frequency multiplier will increase the main frequency of the CPU.

With reference to FIG. 1, the conventional way of resetting the CPU is achieved by an external reset from a south-bridge chipset 11. When the south-bridge chipset 11 performs the reset, a peripheral connecting interface reset (PCI_reset) signal S1 is generated. The PCI_reset signal is transmitted to a north-bridge chipset 12 to reset the north-bridge chipset 12. When north-bridge chipset 12 performs the reset, a CPU reset (CPU_reset) signal S2 is transmitted to the CPU 13 to reset the CPU 13.

However, aside from resetting the CPU 13 in the above-mentioned method, the north-bridge chipset 12 and the south-bridge chipset 11 are reset too. Therefore, it takes extra time to rewrite the data in the north-bridge chipset 12 and the south-bridge chipset 11.

Consequently, how to avoid writing the data required by the north-bridge chipset and the south-bridge chipset when resetting the CPU for saving time is currently an important issue.

SUMMARY OF THE INVENTION

In view of the foregoing, the invention is to provide a motherboard having a north-bridge chipset for automatically generating a rest signal to reset the CPU and the control method thereof.

To achieve the above, a motherboard of the invention includes a south-bridge chipset, a north-bridge chipset, and a CPU. The south-bridge chipset generates at least control-setting data. The north-bridge chipset has a reset register and a control-setting register. The reset register is used to control the north-bridge chipset to generate a rest signal, and the control-setting register is used to store the control-setting data generated by the south-bridge chipset. The CPU has a plurality of configuration parameters and resets these configuration parameters in accordance with the reset signal. The north-bridge chipset writes the control setting-data into the CPU for setting at least one of the configuration parameters.

In addition, the invention also discloses a motherboard control method applied in a motherboard including a north-bridge chipset with a reset register and a CPU with a plurality of configuration parameters. The control method includes the steps of: generating a reset signal according to a value of the reset register by the north-bridge chipset, and resetting the configuration parameters by the CPU according to the reset signal.

Furthermore, the invention also discloses a method for setting a CPU of a motherboard. The motherboard further comprises a north-bridge chipset having a reset register, and the CPU has a plurality of configuration parameters. The method comprises the steps of: generating a reset signal by the north-bridge chipset in accordance with a value of the reset register, and resetting the configuration parameters by the CPU in accordance with the reset signal.

As mentioned above, the invention provides a reset register in the north-bridge chipset. The north-bridge chipset generates a reset signal in accordance with the contents of the reset register. The CPU resets the configuration parameters of the CPU according to the reset signal, without resetting the north-bridge chipset and the south-bridge chipset at the same time.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
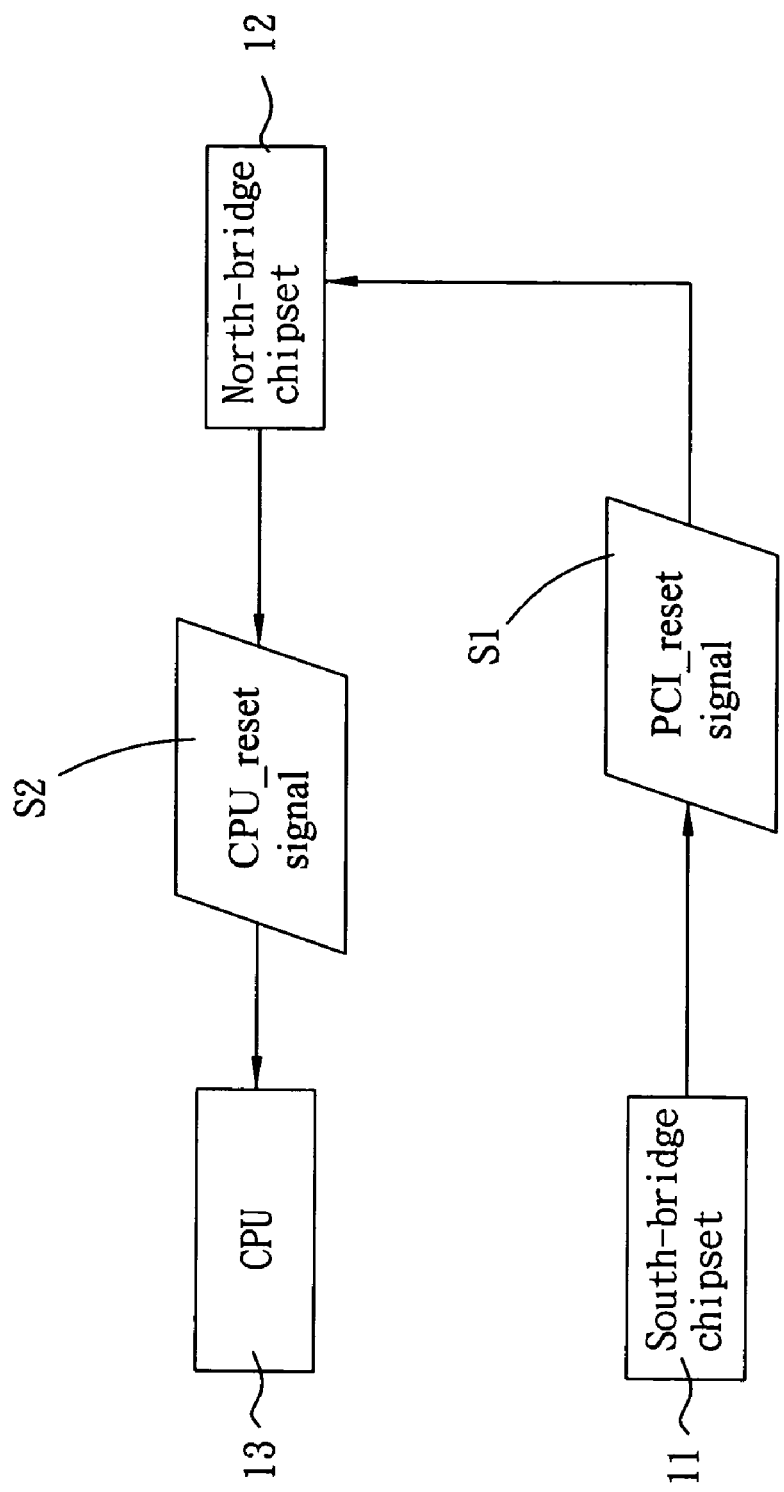
FIG. 1 is a schematic view of a conventional motherboard.
Figure 2:
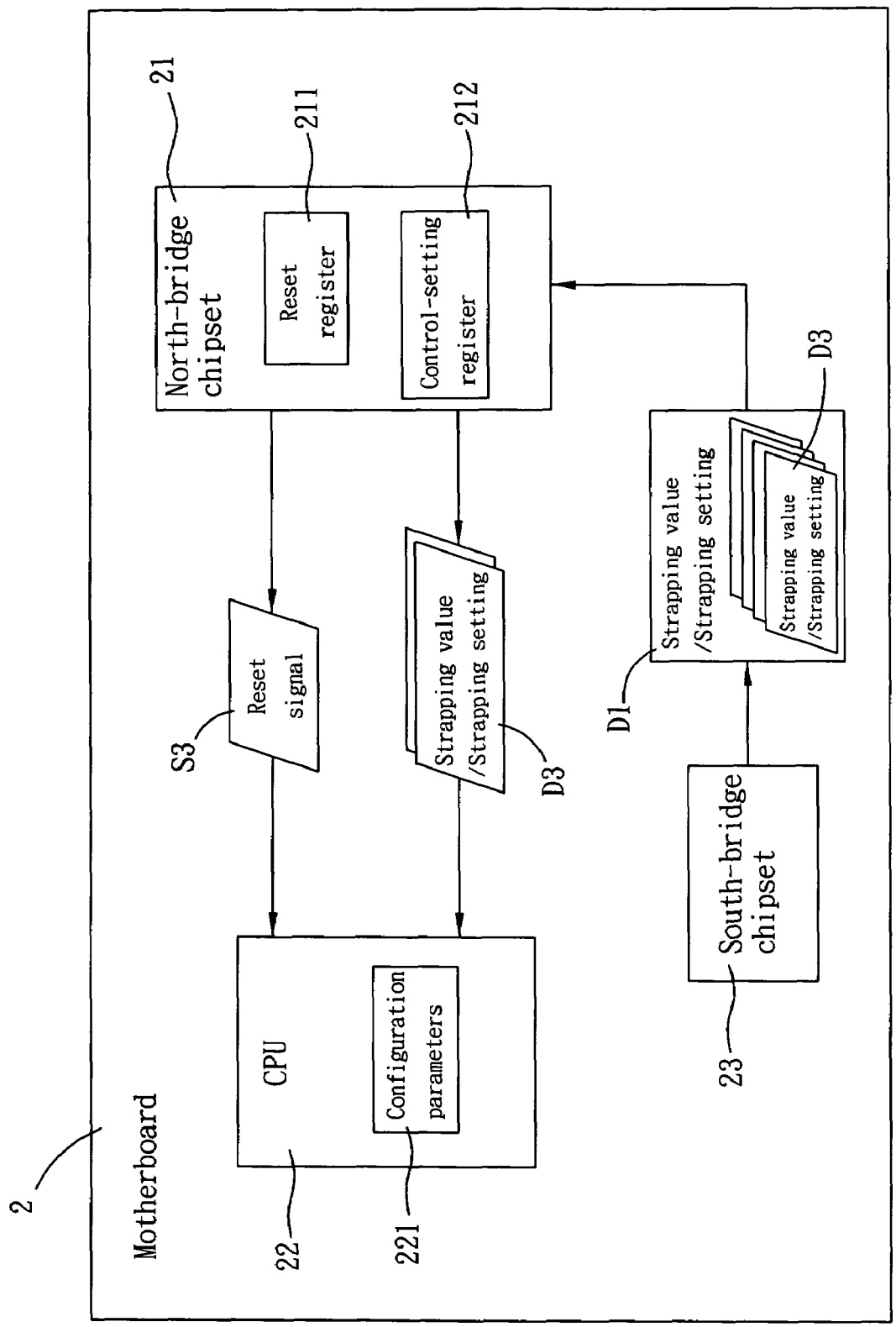
FIG. 2 is a schematic view of the motherboard according to a preferred embodiment of the invention.

As shown in FIG. 2, a motherboard 2 according to a preferred embodiment of the invention has a north-bridge chipset 21, a CPU 22, and a south-bridge chipset 23. To make the invention more comprehensive, the detailed features of the motherboard 2 will be described as follows.

The north-bridge chipset 21 has a reset register 211 and a control-setting register 212. The reset register 211 controls the north-bridge chipset 21 to generate a reset signal S3. In this embodiment, the north-bridge chipset 21 generates the reset signal S3 when a value of the reset register 211 is enabled.

The CPU 22 has a plurality of configuration parameters 221. In this embodiment, the CPU 22 resets the configuration parameters 221 in accordance with the reset signal S3 generated by the north-bridge chipset 21.

The south-bridge chipset 23 outputs at least one strapping value/strapping setting D1 to the north-bridge chipset 21 and stores the strapping value/strapping setting D1 in the control-setting register 212 of the north-bridge chipset 21. In this embodiment, the north-bridge chipset 21 writes the strapping value/strapping setting D3, which is a part of the strapping value/strapping setting D1, into the CPU 22 for setting at least one of the configuration parameters 221 of the CPU 22. Besides, the strapping value/strapping setting D1 can contain at least one of memory module controller control-setting data and memory module control-setting data. Moreover, the memory module control-setting data includes at least one of frequency data and timing data for setting the frequency or clock of a memory module. Furthermore, the control-setting register 212 may also store the setting data of other units in the motherboard 2.

Figure 3:
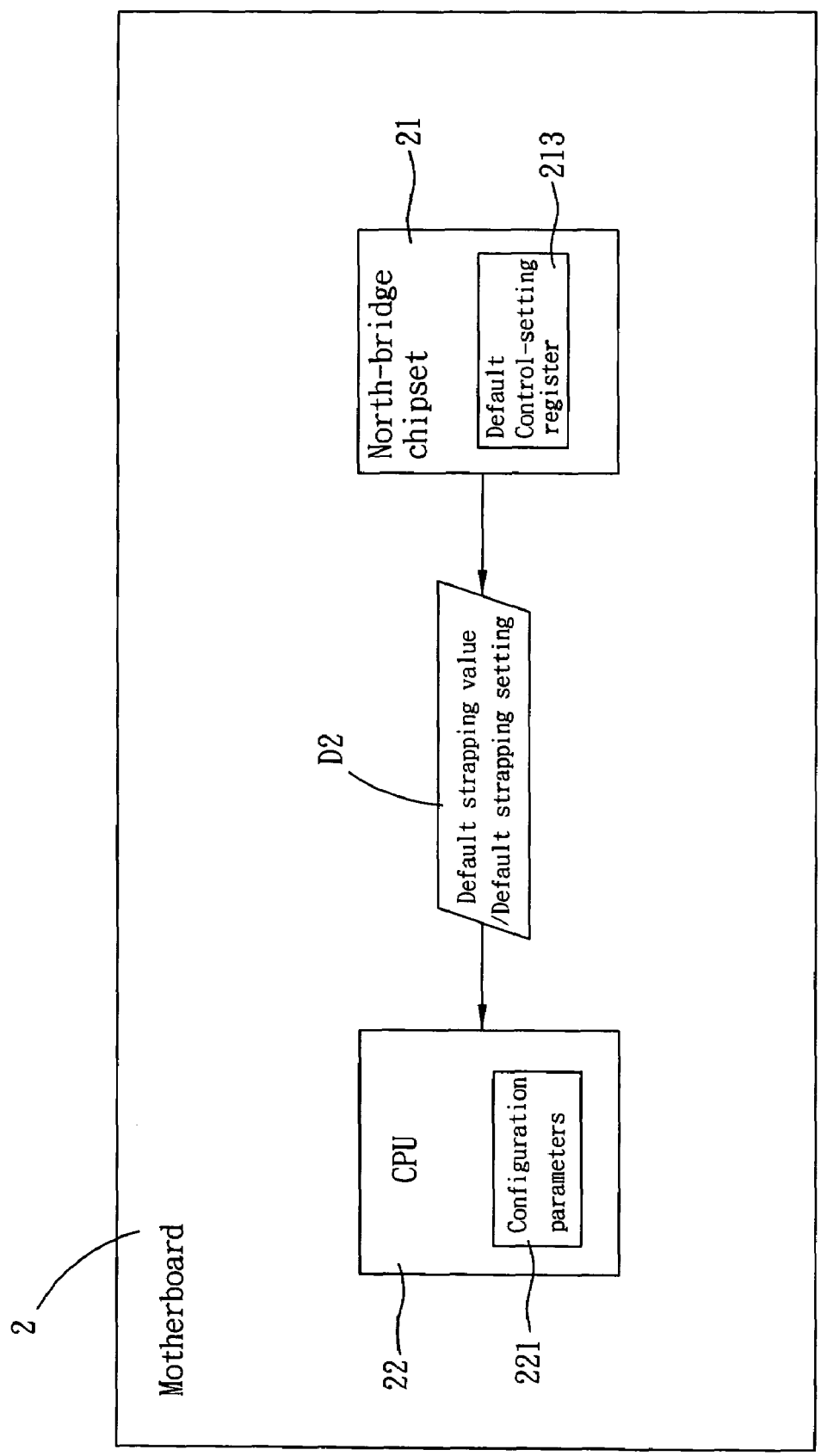
FIG. 3 is a schematic view showing a part of the motherboard according to a preferred embodiment of the invention.

With reference to FIG. 3 showing a schematic partial view of the motherboard 2, the north-bridge chipset 21 also includes a default control-setting register 213 to store at least a default strapping value/default strapping setting D2. The north-bridge chipset 21 writes the default strapping value/default strapping setting D2 into the CPU 22, setting at least one of the configuration parameters 221 of the CPU 22. Depending upon the system requirement, it sets the configuration parameters for the system to return to its default state.

Figure 4:
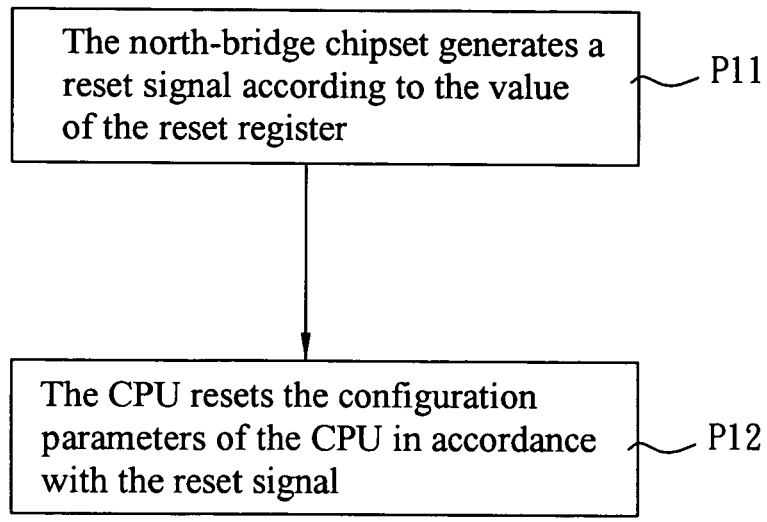
FIG. 4 is a flowchart of a motherboard control method for resetting a CPU according to a preferred embodiment of the invention.

To make the invention more comprehensive, a motherboard control method according to a preferred embodiment of the invention will be described with reference to FIG. 4 in view of FIG. 2.

In step P11, the north-bridge chipset 21 generates a reset signal S3 according to the value of the reset register 211. In this embodiment, the north-bridge chipset 21 generates the reset signal S3 when the value of the reset register 211 is enabled. What means enabled depends upon the choice of the designer and is not restricted here.

In step P12, the CPU 22 resets the configuration parameters 221 of the CPU 22 in accordance with the reset signal S3.

Therefore, the configuration parameters 221 of the CPU 22 are reset by the reset signal S3 automatically sent out by the north-bridge chipset 21. This avoids resetting the north-bridge chipset 21 and the south-bridge chipset 23 at the same time when the CPU 22 is reset.

Figure 5:
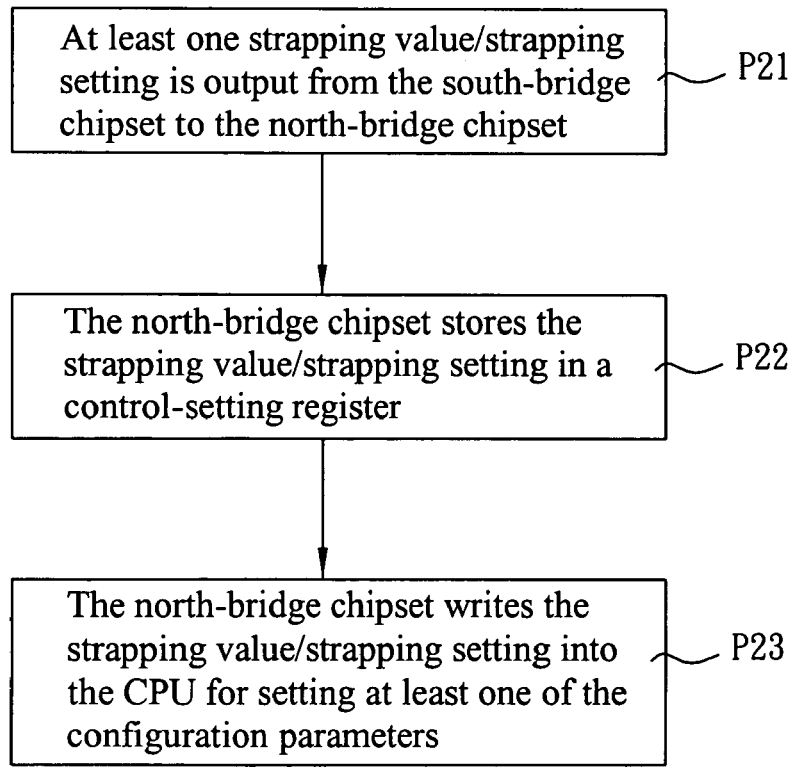
FIG. 5 is a flowchart of a motherboard control method for resetting the configuration parameters of a CPU according to a preferred embodiment of the invention.

With reference to FIGS. 5 and 2, the motherboard 2 further includes a south-bridge chipset 23, and the motherboard control method may further include the following steps.

In step P21, at least one strapping value/strapping setting D1 is output from the south-bridge chipset 23 to the north-bridge chipset 21.

In step P22, the north-bridge chipset 21 stores the strapping value/strapping setting D1 output from the south-bridge chipset 23 in a control-setting register 212.

In step P23, the north-bridge chipset 21 writes the strapping value/strapping setting D3 into the CPU 22 for setting at least one of the configuration parameters 221. In this embodiment, the north-bridge chipset 21 writes the strapping value/strapping setting D3 into the CPU 22 for setting the configuration parameters 221 only after the north-bridge chipset 21 sends out the reset signal S3 to the CPU 22 and the CPU 22 resets the configuration parameters 221.

The invention further discloses a method for setting a CPU of a motherboard. The motherboard further comprises a north-bridge chipset having a reset register, and the CPU has a plurality of configuration parameters. The method for setting a CPU includes the following steps. First, a reset signal is generated by the north-bridge chipset in accordance with a value of the reset register. Then, the configuration parameters are reset by the CPU in accordance with the reset signal. The method for setting a CPU of a motherboard is similar to the motherboard control method of the previous embodiment, so the detailed descriptions are omitted for concise purpose.

In summary, the invention adds a reset register to the north-bridge chipset. The north-bridge chipset generates a reset signal in accordance with the value of the reset register. The CPU resets the configuration parameters thereof according to the reset signal without resetting the north-bridge chipset and the south-bridge chipset at the same time.

Moreover, a control-setting register is included in the north-bridge chipset to store the strapping value/strapping setting output from the south-bridge chipset. After the CPU is reset, the north-bridge chipset writes the strapping value/strapping setting into the CPU and sets the configuration parameters according to the system requirements.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motherboard, comprising:
   a south-bridge chipset, which generates at least control-setting data;
   a north-bridge chipset, which has a reset register for controlling the north-bridge chipset to generate a reset signal and a control-setting register for storing the control-setting data generated by the south-bridge chipset; and
   a central processing unit (CPU), which has a plurality of configuration parameters, wherein the CPU resets the configuration parameters in accord with the reset signal, and the north-bridge chipset writes the control-setting data into the CPU to set at least one of the configuration parameters of the CPU.

2. The motherboard of claim 1, wherein the control-setting data includes memory module control-setting data and memory module controller control-setting data.

3. The motherboard of claim 2, wherein the memory module control-setting data include at least one of frequency data and timing data.

4. The motherboard of claim 1, wherein the north-bridge chipset further comprises a default control-setting register for storing at least default control-setting data, and the north-bridge chipset writes the default control-setting data into the CPU to set at least one of the configuration parameters.

5. A motherboard control method applied to a motherboard, wherein the motherboard comprises a north-bridge chipset and a CPU, the north-bridge chipset has a reset register, and the CPU has a plurality of configuration parameters, the method comprising the steps of:
   generating a reset signal by the north-bridge chipset in accordance with a value of the reset register;
   resetting the configuration parameters by the CPU in accordance with the reset signal; and
   outputting at least control-setting data by a south-bridge chipset to the north-bridge chipset wherein the north-bridge chipset stores the control-setting data in a control-setting register and the north-bridge chipset writes the control-setting data to the CPU for setting at least one of the configuration parameters.

6. The motherboard control method of claim 5, further comprising the step of:
   writing at least default control-setting data by the north-bridge chipset into the CPU to set at least one of the configuration parameters of the CPU.

7. The motherboard control method of claim 6, wherein the default control-setting data is stored in a default control-setting register of the north-bridge chipset.

8. The motherboard control method of claim 5, wherein the north-bridge chipset generates the reset signal when the value of the reset register is enabled.

* * * * *